Aug. 1, 1950

G. M. KELLY 2,516,883

VACUUM CLEANER COUPLING

Filed Sept. 5, 1947

INVENTOR.
GEORGE M. KELLY
BY
Charles S. Penfold
ATTORNEY

Patented Aug. 1, 1950

2,516,883

UNITED STATES PATENT OFFICE 2,516,883

VACUUM CLEANER COUPLING

George M. Kelly, Sturgis, Mich., assignor to Douglas Manufacturing Co., Bronson, Mich., a corporation of Michigan Application September 5, 1947, Serial No. 772,445

10 Claims. (Cl. 285—174)

This invention relates generally to coupling devices and more particularly is directed to a fitting or plug device, secured to the extremity of a conduit, such as the conduit of a vacuum cleaner, whereby the hose may be detachably connected to the cleaner.

One important object of the invention is to provide a fitting which will allow the conduit or hose to rotate freely with respect to the fitting when the latter is connected to the cleaner. This arrangement has proven desirable because twisting, coiling, and kinking of the conduit is prevented when an accessory such as a floor nozzle, connected to the opposite end of the conduit is being used.

Another object is to provide a fitting which consists of very few parts which may be easily and quickly assembled into a compact unit on a production basis.

A further object is to provide a fitting which may be easily and quickly detachably connected to the cleaner in a manner whereby the air passing through the conduit will not escape through the fitting; in other words, an uninterrupted continuous passage is provided between the conduit and the interior of the cleaner.

A still further object is to provide a fitting or plug which may slightly rotate with respect to the cleaner and the conduit may rotate with respect to the plug.

A particular object of the invention is to provide an improved method and means whereby to facilitate the assembling of the parts of the coupling.

Other objects and advantages of the invention will be apparent after reading the description hereinafter set forth in connection with the drawing annexed hereto.

Figure 1:
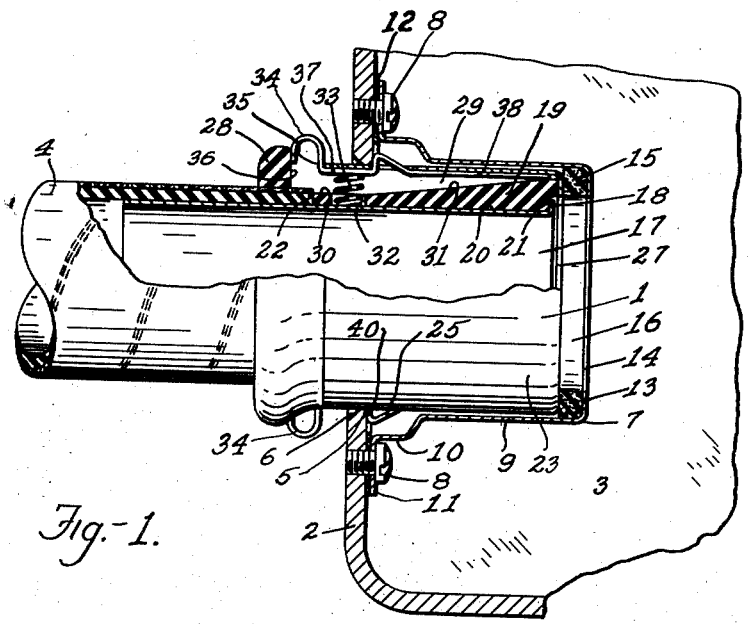
Figure 1 shows the conduit fitting secured or assembled with a vacuum cleaner, with portions of the assembly broken away to clearly illustrate the details of construction.

Referring more in detail to the structure illustrated in Figure 1, numeral 1 represents the fitting or plug detachably connected to the end wall 2 of a vacuum cleaner housing 3, and 4 is the conduit or hose rotatably associated with the fitting.

The end wall of the vacuum cleaner housing is provided with a circular opening 5 through which the fitting is projected. The opening is preferably chamfered at 6 whereby to assist in piloting the plug into the opening. A receptacle or socket 7 for the plug is secured to the inner side of the end wall 2 by a plurality of screws 8. The receptacle includes a cylindrical portion 9 serving as a bearing or support for a part of the plug, an enlarged annular portion 10 which forms a space within which portions of the latches may operate, and a radially extending flange 11. A gasket 12 is disposed between the flange 11 and the inner side of the end wall of the cleaner so as to seal off and prevent any air from being drawn into the cleaner other than through the passage desired. The receptacle 7 is also provided with an end wall 13 provided with an aperture 14. A resilient washer 15 is disposed in the receptacle 7 and preferably cemented to the end wall 13 to serve as a yieldable abutment for the inner end or extremity of the plug. The washer 15 is provided with an aperture 16 corresponding to the aperture 14.

The conduit is of conventional construction. One extremity of an elongated tube 17 is firmly secured against rotation in the conduit 4 and its other extremity extends beyond the end of the conduit and provides a fixed mounting or support about which the plug 1 may rotate. The free end of the tube 17 is preferably provided with a radial locking flange 18.

The plug preferably includes a tubular cylindrical body 19 constructed from some desirable material, such as pyroxylin plastic or phenolic condensate. The body is provided with a round opening 20 through which the tube 17 extends whereby to rotatably mount the plug. The end of the body which first enters the receptacle 7 of the cleaner is preferably recessed to provide a shoulder 21 which is engaged by the radial flange 18 of the tube for holding the plug connected to the conduit. The opposite or trailing end of the body is also preferably recessed to provide a shoulder 22 which is engaged by the end of the conduit whereby to hold the plug against movement in an axial direction. The end of the conduit being seated in the last mentioned recess is well protected and serves to conceal any end which may not have been cut or severed as intended. Also, any frayed ends of the fabric covering on the conduit are concealed from view.

A cup shaped ferrule 23 snugly surrounds the body 19 and is detachably connected thereto by the catch portions 24 of the latches 25, the catch portions 24 projecting through square shaped openings 26 provided therefor in the ferrule. Additional or auxiliary means for locking these parts together will be described subsequently. Thus, it will be evident that the intervening space between the tube and ferrule is substantially filled or taken up by the body 19. The bottom or end wall of the cup shaped ferrule abuts the extreme end of the body and is provided with an aperture 27 corresponding in size to the apertures 14 and 16 in the receptacle or socket and washer 15. The entrance end of the ferrule is preferably slightly rounded to assist in piloting the plug into the chamfered opening 6 of the cleaner and into the receptacle 7. The ferrule is of a length somewhat less than the length of the body 19 and terminates more or less against an exposed enlargement 28 of the body which more or less serves as a handle to assist in connecting and disconnecting the plug with respect to the cleaner.

The body 19 is further provided with a pair of diametrically disposed longitudinally extending shallow channels or pockets 29, generally rectangular in cross section.

Each channel preferably includes a relatively short horizontal base wall 30 adjacent the shoulder 22, and an inclined bottom wall 31 with terminations adjacent the wall 30 and the front extremity of the body as clearly depicted in Figure 1. At or adjacent the junction between the walls just mentioned there is preferably provided a round hole 32 which receives and locates one end of a helical spring 33.

A resilient latch 25 is disposed in each of the channels 29. One extremity of each latch is preferably wedged or caught in between the upper limit of the inclined bottom wall 31 of each channel and the ferrule and the opposite extremity is provided with a rounded loop portion 34 which projects outwardly through an opening formed by the inner marginal edge of the ferrule and the channel to provide oppositely disposed finger or thumb operated latch means at appropriate locations with respect to the round handle portion 28. The downturned portion 35 of each latch is more or less concealed by the left end wall 36 of each channel. Each latch is preferably planar in character except for the catch portion 24 and loop portion 34, and includes flat portions 37 and 38 with the catch portion therebetween. Each catch preferably includes an inclined or cam portion 39 and a shoulder portion 40. These flat portions 37 and 38 are normally pressed against the inner cylindrical surface of the ferrule by the spring 33 which preferably bears against the portion 37 between the catch and loop portions in order to obtain the action desired.

Figures 2, 3:
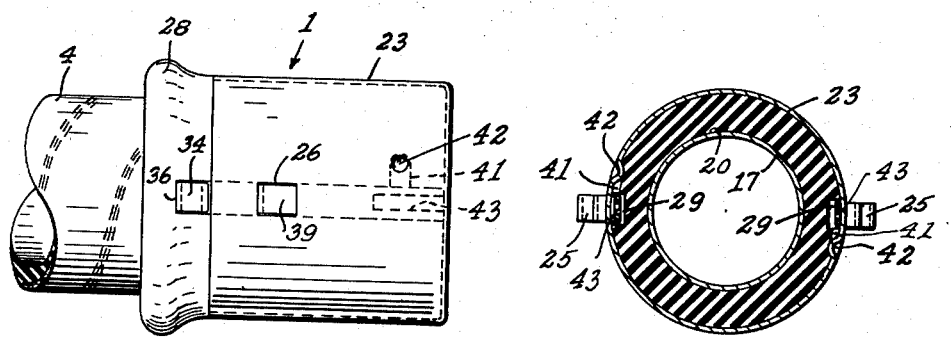
Figure 2 is a transverse sectional view taken through an appropriate part of the assembly illustrated in Figure 1.
Figure 3 is a side view of the coupling.
Figures 4, 5, 6:
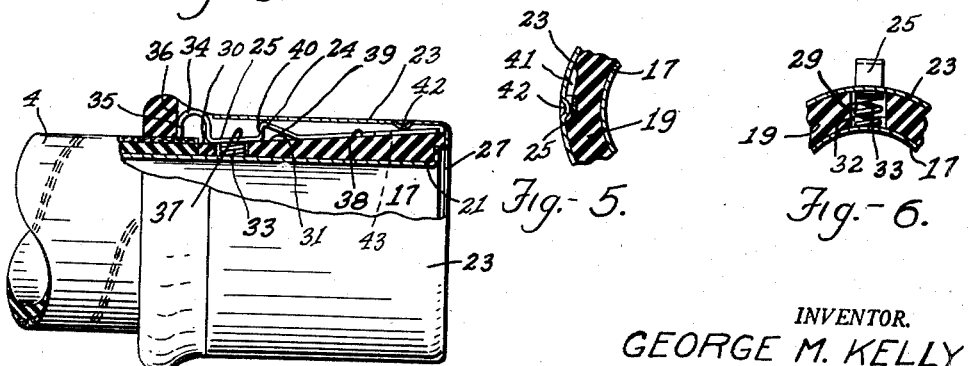
Figure 4 is a view similar to Figure 3, portions of which are shown in section to illustrate the depressed position of the latch means.
Figure 5 is a detailed sectional view depicting the locking means employed for detachably securing parts of the coupling together.
Figure 6 is another detailed sectional view illustrating characteristics of the latch means.

As stated above one important object of the invention is to provide improved means whereby to facilitate assembling parts of the coupling. This is accomplished by providing the outer cylindrical surface of the non-metallic body part 19 with diametrically disposed transverse corresponding recesses 41 which intersect the channels 29, for the reception of inwardly extending corresponding projections 42. As illustrated in Figures 2 and 3 the projections 42 are seated in the recesses 41 whereas Figures 4 and 5 show their respective positions just prior to entry into such recesses.

To assist in assembling the parts, the latches 25 and springs 33 are seated in the channels 29. The ferrule is then telescoped over the body 19 so that the projections 42 will be directed in the channels and ride along the flat portions 38 of the latches to hold them in place while the catches 24 and the inclined cam portions 39 thereof urge the latches inwardly to the position illustrated in Figure 4, whereupon the ferrule is rotated relative to the body to place the projections in registry with the recesses. Attention is directed to the fact that when the ferrule is being slipped longitudinally over the body 19, the catch portions 24 slidably engage the inner surface of the ferrule but when the projections move into the recesses 41, the catch portions will snap outwardly into the openings 26 provided therefor in the ferrule to detachably lock the parts together. By merely depressing the latches sufficiently to permit one to effect a reverse relative rotational movement between the body and ferrule, the ferrule may be slipped off the body.

In view of the foregoing it will be evident that to connect the plug to the cleaner it is merely necessary to grasp either the conduit or plug or both and force the plug into the opening 5 of the cleaner, to cause the cam portions 39 of the catches to be moved inwardly, and when the entrance end of the plug engages and compresses the washer 15, seated in the receptacle 7, the catch portions will snap outwardly into the space formed by the annular portion 10 of the receptacle so that the shoulder portions 40 will abut the inner side or surface of the end wall of the cleaner whereby to detachably hold the plug in place. So held the conduit and tube 17 are free to rotate with respect to the plug and prevent kinking of the conduit. To release the plug it is merely necessary to depress the finger portions 34 of the latches so that the shoulder portions 40 of the latches disengage the inner side of the end wall of the housing and then pull the plug. The washer 15 not only serves as a seal but tends to more or less throw the plug outwardly when the plug is being disconnected.

It will also be manifest that since the latches are resilient and are spring pressed the latches are sensitive but very positive in action, and accordingly provide a quick detachable connection between the conduit fitting and the vacuum cleaner.

It will also be evident that the projections 42 and recesses 41 provide additional locking means and means whereby to assist in assembling the latches above referred to. In this connection attention is directed to the fact that the latches are preferably formed with slots 43 depicted in Figures 2 and 3 so as to provide clearance for the projections 42 during the assembly and disassembly of the parts.

Moreover, it will be apparent that if found desirable the washer 15 may be constructed of some desirable material which will allow the plug to rotate in the receptacle 7 as well as with respect to the conduit 4; or the washer may be eliminated entirely in which event the entrance end of the plug would bear against the end wall of the receptacle to allow the plug to rotate in the receptacle.

Having thus described my invention, it is obvious that various other modifications may be made in the same without departing from the spirit of the invention; and, therefore, I do not wish to be understood as limiting myself to the exact form, construction, arrangement, and combination of parts herein shown and described.

I claim:

1. A plug device comprising, a body member, a pocket provided in said body, an apertured ferrule surrounding at least a portion of said body and covering a part of said pocket, an axial opening in said body, a tubular member extending through said axial opening, a hole in the bottom wall of said pocket intersecting said axial opening, said pocket, said tubular member and said ferrule forming a chamber, latch means in said chamber having a catch portion projecting through the aperture in the ferrule and a finger operated portion projecting outwardly from the uncovered part of the pocket, and resilient means disposed in the hole engaging the tubular member and acting on said latch means for urging its projecting portions to predetermined positions.

2. A plug device comprising, a bearing, a body carried by said bearing provided with a longitudinally extending channel in its exterior surface, a ferrule surrounding at least a portion of said body and covering a part of said channel, an aperture in said ferrule, and latch means in said channel having a catch portion resiliently supported on said bearing and urged outwardly through said aperture and a portion extending outwardly from the uncovered part of the channel for controlling the operation of the catch portion.

3. A coupling device comprising, a mounting provided with an opening, a receptacle secured to one side of said mounting, a seal disposed between said receptacle and said one side of said mounting, a sealing means disposed in said receptacle, a plug device carried by the end of a conduit disposed in said opening with one end of said device bearing against said sealing means, and means cooperating with said mounting for detachably holding said plug device in place.

4. A coupling comprising, a vacuum cleaner housing part provided with an opening, a receptacle secured to one side of said part in substantial axial alignment with said opening, a plug device secured to a conduit disposed in said opening, and resilient sealing means disposed between said plug device and said receptacle.

5. A conduit, a tube supported on said conduit, a barrel carried by said tube, a longitudinal recess and a transverse slot provided in said barrel, a yieldable latch seated in said recess, a ferrule mounted on said barrel, an opening provided in said ferrule receiving a portion of said latch, and a projection provided on said ferrule receivable in said slot upon rotation of the ferrule whereby to lock the ferrule and latch to said barrel.

6. A coupling comprising a body, a latch and a holding member, a keyway in said body, and said member being provided with an opening and a key constructed and arranged whereby when the key is seated in the keyway a portion of the latch will project through the opening to hold the parts assembled.

7. A conduit, a tube supported by said conduit, a barrel carried by said tube, opposed longitudinal recesses and transverse slots provided in said barrel, latches seated in said recesses, a ferrule mounted on the barrel, openings provided in said ferrule for receiving portions of the latches, and projections provided on the ferrule in a manner whereby they may be received in the slots upon rotation of the ferrule to lock the ferrule and latches to said barrel.

8. A tube adapted for support on a conduit, a barrel carried by said tube, a longitudinal recess and a transverse slot provided in said barrel, a yieldable latch seated in said recess, a ferrule mounted on said barrel, an opening provided in said ferrule receiving a portion of said latch, and a projection provided on said ferrule receivable in said slot upon rotation of the ferrule whereby to lock the ferrule and latch to said barrel.

9. A tube adapted for support on a conduit, a barrel carried by said tube, a longitudinal recess and a transverse slot provided in said barrel, a yieldable latch seated in said recess, a ferrule mounted on said barrel, an opening provided in said ferrule receiving a portion of said latch, a projection provided on said ferrule receivable in said slot upon rotation of the ferrule whereby to lock the ferrule and latch to said barrel, said projection being ridable on the latch prior to its reception in said slot.

10. A tube adapted for support on a conduit, a barrel carried by said tube, opposed longitudinal recesses and transverse slots provided in said barrel, latches seated in said recesses, a ferrule mounted on the barrel, openings provided in said ferrule for receiving portions of the latches, and projections provided on the ferrule in a manner whereby they may be received in the slots upon rotation of the ferrule to lock the ferrule and latches to said barrel.

GEORGE M. KELLY.

REFERENCES CITED

The following references are of record in the file of this patent:

UNITED STATES PATENTS

| Number | Name | Date |
| --- | --- | --- |
| 2,102,802 | Lofgren | Dec. 21, 1937 |
| 2,150,765 | Forsberg | Mar. 14, 1939 |
| 2,266,796 | Parker | Dec. 23, 1941 |